Oct. 25, 1966          F. S. FELL          3,280,647
POWER TRANSMISSION AND STEERING ASSEMBLY
Filed Jan. 27, 1964          2 Sheets-Sheet 1
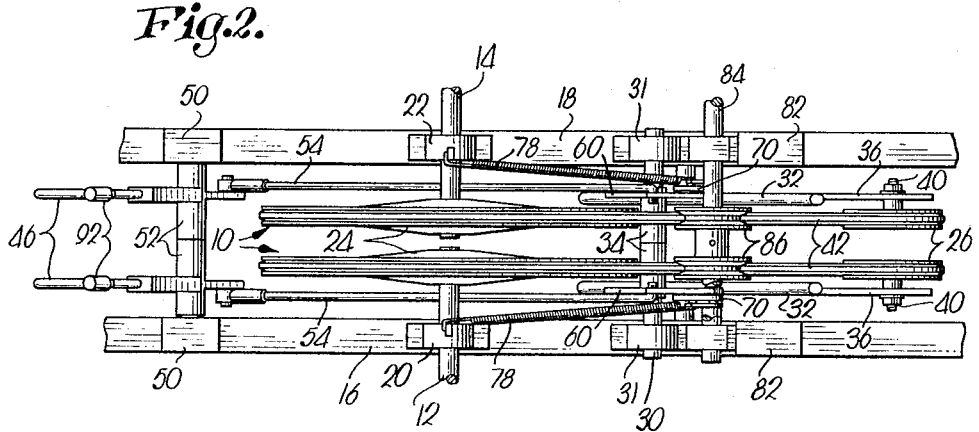
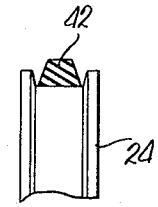
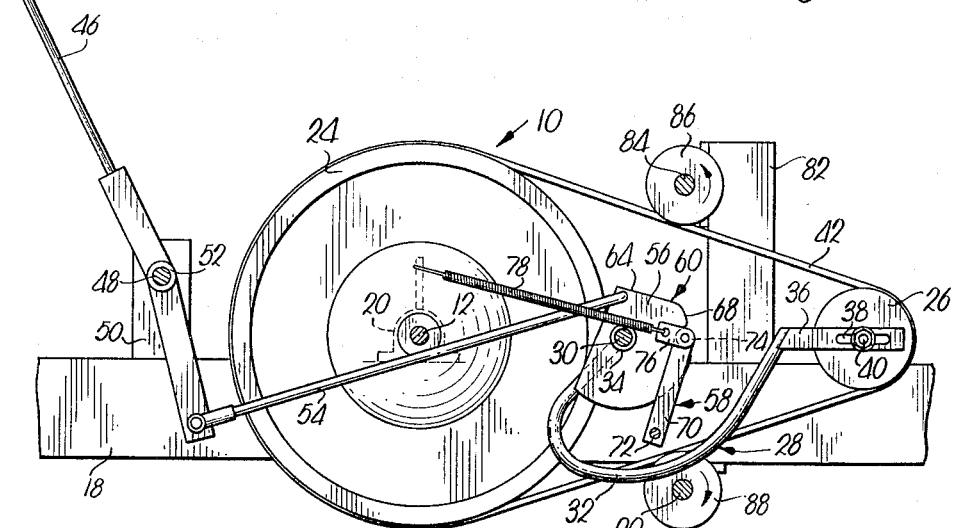
INVENTOR.
Ferol S. Fell
BY
Hovey, Schmidt, Johnson & Hovey
ATTORNEYS.

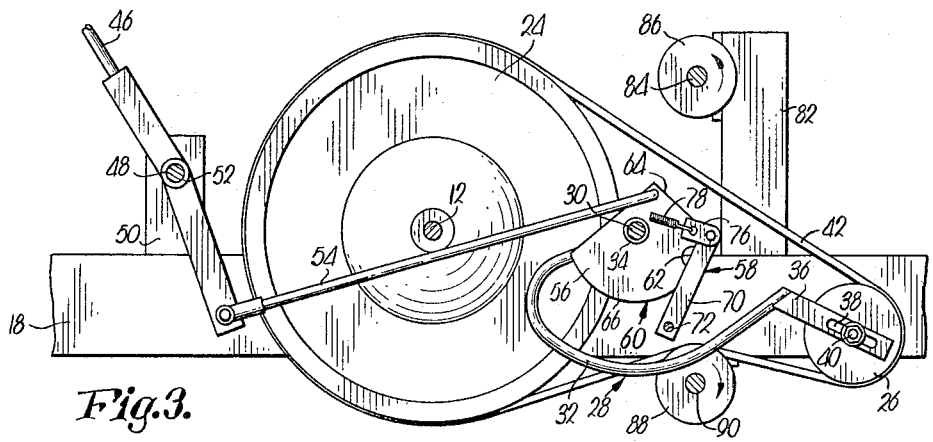

United States Patent Office 3,280,647
Patented Oct. 25, 1966

3,280,647
POWER TRANSMISSION AND STEERING ASSEMBLY
Ferol S. Fell, Newton, Kans., assignor to Hesston Manufacturing Co., Inc., Hesston, Kans., a corporation of Kansas
Filed Jan. 27, 1964, Ser. No. 340,458
9 Claims. (Cl. 74—220)

This invention relates to a power transmission system especially suitable for use in driving and steering a vehicle and has as its primary object the provision of a transmission which can be releasably maintained in an operative position by interlock structure of improved construction forming a part of the transmission, thus relieving the operator of the transmission from having to continuously control the operation thereof by manual power.

Another object of the present invention is the provision of improved transmission mechanism adapted for imparting forward and reverse movement to either or both of a pair of ground-engaging vehicle supports by the manipulation of control means movable in opposed directions from a neutral position at which the control means is releasably maintained until the proper movement is imparted thereto to thereby preclude inadvertent operation of the mechanism.

Still another object of the present invention is the provision of a transmission system of the type described wherein the control means is releasably latched in place at its operative position corresponding to forward movement of the vehicle because its maximum motion is forwardly, whereas the control means is manually maintained in its operative position corresponding to reverse movement of the vehicle since it moves in reverse only a small fraction of the time during which the vehicle is in motion.

A further object of the present invention is the provision of a transmission system utilizing a pair of oppositely rotating drive pulleys, a pair of rotatable driven pulleys, and a flexible, continuous belt trained about the driven pulleys and disposed between the drive pulleys so that, as one of the driven pulleys is shifted toward one or the other of the drive pulleys, the belt will be moved into frictional engagement with and be driven by the corresponding drive pulley to in turn drive both of the driven pulleys.

In the drawings:
FIGURE 1 is a side elevational view of the transmission system forming the present invention and illustrating the relative dispositions of the parts thereof when the transmission is in a neutral position;
FIG. 2 is a top plan view of the transmission as applied to a pair of independently rotatable shafts which may be coupled to a pair of ground-engaging vehicle wheels;
FIG. 3 is a view of the transmission similar to the view of FIG. 1 but illustrating the relative dispositions of the parts for imparting movement to the corresponding shaft in one direction and requiring that the shiftable parts be manually maintained in position;
FIG. 4 is a view similar to FIG. 3 but illustrating the shiftable parts being held in their operative positions by latch mechanism to preclude having to manually hold the parts in their operative positions;
FIG. 5 is a view similar to FIGS. 3 and 4 but illustrating the relative dispositions of the parts for imparting movement to the shaft in the opposite direction;
FIG. 6 is an enlarged, fragmentary view of the flexible, continuous belt coupled to one of a pair of driven pulleys forming a part of the present invention; and
FIG. 7 is an enlarged, fragmentary view of a portion of the latch mechanism showing a latch engageable with the cam edge of a notched plate also forming a part of the latch mechanism.

The transmission system of the present invention is broadly denoted by the numeral 10 and is adapted especially for use in driving and steering a pair of independently rotatable, ground-engaging wheels of a vehicle or the like. To this end, a pair of transmissions 10 is employed in side-by-side relationship as shown in FIG. 2 and is coupled with respective shafts 12 and 14 mounted on beams 16 and 18 respectively, by bearing blocks 20 and 22 respectively. Beams 16 and 18 form a part of the structure of the vehicle and shafts 12 and 14 are coupled to the ground-engaging wheels thereof.

Each of the transmissions 10 utilized in the manner shown in FIG. 2 is identical with the other so that a description of one of the transmissions will suffice for a description of both.

Transmission 10 includes a first driven element in the nature of a belt-engaging pulley 24 rigid to shaft 12 for rotation therewith. A second driven element in the nature of a pulley 26 is disposed in spaced relationship to pulley 24 and is of a diameter less than the diameter of pulley 24. Supporting apparatus 28 mounts pulley 26 for swinging movement about a shaft 30 parallel with shaft 12 and disposed approximately in the same horizontal plane as the latter. Shaft 30 spans the distance between beams 16 and 18 and is secured thereto by suitable mounting blocks 31. Apparatus 28 comprises a tube 32 bent in a substantially U-shape and coupled at one end thereof to a collar 34 rotatable on shaft 30. Means may be provided for preventing collar 34 from moving longitudinally of shaft 30. A bar 36 having a slot 38 therein, extends laterally from the opposite end of tube 32 and receives bolt means 40 which journals pulley 26 for rotation in the vertical plane in which pulley 24 is disposed. Pulley 26 is disposed therefore for movement in opposed directions about shaft 30 as tube 32 is swung in a manner hereinafter described.

A flexible, continuous device 42, in the nature of an endless, flexible belt, is trained about pulleys 24 and 26 and maintained under tension when pulley 26 is in the position thereof shown in FIG. 1. The tension of device 42 may be adjusted by releasably securing pulley 26 in any one of a number of fixed locations with respect to slot 38 by virtue of the construction of bolt means 40. As shown in FIG. 2, pulley 26 is spaced from the plane of bar 36 and tube 32 lies in a vertical plane spaced from the vertical plane in which pulleys 24 and 26 are disposed.

Means for swinging tube 32 and thereby pulley 26 about shaft 30, includes a manually manipulatable assembly 44 including a lever or control stick 46 pivoted adjacent its normally lowermost end about a shaft 48 rigid to and spanning the distance between a pair of uprights 50 secured to the upper surfaces of beams 16 and 18. To this end, a collar 52 is rigid to lever 46 and journaled on shaft 48 so that as the upper end of lever 46 is moved in one direction, the lower end of lever 46 is shifted in the opposite direction.

A link 54 is pivoted at one end thereof to the lowermost end of lever 46 and at the opposite end thereof to an irregularly-shaped plate 56 forming a part of latch mechanism broadly denoted by the numeral 58. Plate 56 is rigid to collar 34 and thereby the corresponding end of tube 32 so that movements of lever 46 in opposed directions, causes pulley 26 also to swing in opposed directions about shaft 30. In this respect, it is noted that the junction between link 54 and plate 56 is spaced radially from shaft 30.

Plate 56 is provided with a cam edge 60 having a first portion 62, a second portion 64, a third portion 66, and a fourth portion 68. Portion 62 defines a notch in the periphery of plate 56 and portion 68 substantially interconnects portions 62 and 64 as shown in FIG. 5. Portion 66 is on the side of portion 62 opposite to the side corresponding to portions 64 and 68.

Portion 64 is substantially straight, portion 68 being inclined to portion 64 and defining discontinuities at the junction between portions 64 and 68 and at the junction between portions 62 and 68. Portion 62 is substantially concave, while portion 66 is substantially convex and concentric to shaft 30.

In addition to plate 56, latch mechanism 58 includes a latch bar 70 pivoted at one end thereof by a pin 72 projecting laterally from beam 16. The opposite end of latch bar 70 carries a roller 74 which engages cam edge 60. An ear 76 is journaled also on the opposite end of latch bar 70 and is coupled to one end of a coil spring 78 for biasing latch bar 70 in a counterclockwise sense when viewing FIG. 1. The opposite end of spring 78 is coupled to an ear 80 projecting upwardly from the corresponding bearing block 20. Latch 58 is thus made up of two parts, namely, plate 56, which is in effect camming structure, and latch bar 70 which is cammed by edge 60 of plate 56.

A pair of uprights 82 extends upwardly from beams 16 and 18 respectively, and journals a shaft 84 which spans the distance therebetween. A pair of first driven members or pulleys 86 is rigid to shaft 84 and is disposed within the vertical planes of the corresponding pulleys 24 and 26, respectively. A pair of second drive members or pulleys 88, only one of which is shown in FIG. 1, is rigid to a shaft 90 carried in any suitable manner on beams 16 and 18 for rotation. Pulleys 88 are disposed in the same planes as respective pulleys 24 and 26 and in vertical alignment with corresponding first drive pulleys 86. Shafts 84 and 90 are coupled in any suitable manner to a prime mover so that pulleys 86 will rotate in a counterclockwise sense, and pulleys 90 will rotate in a clockwise sense when viewing FIG. 1.

Pulleys 86 and 88 of each transmission 10 are disposed out of driving relationship to belt 42 when pulley 26 is in the position of FIG. 1. This is the neutral position of transmission 10 and in this position, roller 74 of the corresponding latch bars 70 is disposed in engagement with portion 62, i.e., in the notch formed in the periphery of plate 56. Roller 74 is held in this position by the bias force of spring 78 and thus is interlocked or latched to plate 56 to preclude inadvertent movement of pulley 26 in either of the opposed directions of movement thereof. The configuration of belt 42 is illustrated in FIG. 6 wherein the belt is of a substantially trapezoidal shape for engaging pulleys 24 and 26 surrounded thereby and for engaging pulleys 86 and 88 on opposed sides thereof.

In a first neutral position, as shown in FIG. 1, pulley 26 is disposed with its axis in substantial horizontal alignment with shaft 12 and shaft 30. Belt 42 is out of driving relationship to either of the corresponding pulleys 86 and 88 on either side thereof.

By shifting lever 46 in a counterclockwise sense when viewing FIG. 1, pulley 26 is moved in a clockwise sense about shaft 30. Lever 46 is moved a distance sufficient to rotate plate 56 until roller 74 is in engagement with portion 64 of edge 60. This condition is illustrated in FIG. 4 and shows the belt 42 trained about and in frictional engagement with pulley 88 to in turn rotate pulley 24 in a counterclockwise sense. This motion will impart a counterclockwise rotation to shaft 12. When roller 74 engages portion 64 of edge 60, plate 56 is releasably interlocked or latched in place and no manual effort is required to maintain lever 46 in its position of FIG. 4. There is no tendency for plate 56 to rotate in a counterclockwise sense by virtue of the configuration of portion 64 with respect to the remaining portions of edge 60. Any tendency for plate 56 to rotate in a counterclockwise sense will be resisted by the bias force of spring 78.

If lever 46 is shifted in a clockwise sense, plate 56 will rotate in a counterclockwise sense about shaft 30 and pulley 26 will move to the position thereof illustrated in FIG. 5. Belt 42 will then be trained around and in frictional engagement with pulley 86 so that belt 42 will be driven in the opposite direction from that shown in FIG. 4, and pulley 24 will rotate in a clockwise sense. There is no interlocking of pulley 26 in the position of FIG. 5 since roller 74 engages portion 66 which is convex in configuration and does not tend to maintain plate 56 releasably fixed relative to latch bar 70. Thus, when lever 46 is released, plate 56 will tend to rotate in a clockwise sense until roller 74 engages within the concave portion 62 on the edge 60 of plate 56.

Lever 46 also may be moved in a counterclockwise sense from its neutral position until roller 74 is in engagement with portion 68 of edge 60. This condition is illustrated in FIG. 3 and shows belt 42 partially trained about and in frictional engagement with pulley 88 for rotating pulley 24 in a counterclockwise sense. Although belt 42 will not be in as great a frictional engagement with pulley 88 as in the case illustrated in FIG. 4, a driving action will be imparted to pulley 24 unless there is a load on shaft 12, during which time belt 42 will tend to move relative to pulley 24 with no driving of pulley 24. This is very important because spinning of pulley 88 while belt 42 remains stationary would result in undue wear of belt 42 at one point. The condition illustrated in FIG. 3 is utilized for fine steering of the vehicle in a manner hereinafter described.

In operation, the pair of transmissions 10 is mounted in the manner shown in FIG. 2 and in position so that the handles 92 on the upper ends of levers 46 may be manually grasped by the operator of the vehicle.

Pulleys 86 and 88 are set into rotation in their respective directions by actuating the prime mover coupled to shafts 84 and 90 during which time levers 46 are in their neutral positions illustrated in FIG. 1. When it is desired that the vehicle move forwardly, and assuming that shafts 12 and 14 rotate in a counterclockwise sense when viewing FIG. 1 in order to move forwardly, both levers 46 are shifted in a counterclockwise sense when viewing FIG. 1 until rollers 74 of the respective latch mechanisms 58 engage portions 64 of edges 60 on the corresponding plates 56. Corresponding pulleys of transmissions 10 are of the same size so that the vehicle wheels will rotate at the same speed and the vehicle will traverse a straight line path over the ground.

When it is desired to make a right-angle turn, one of the levers 46 may be shifted to its neutral position depending upon the direction in which it is desired to turn, so that the corresponding drive wheel will cease rotating. When the proper direction is reached, the neutral lever 46 will again be moved to its forward operating position and the vehicle will proceed in the usual manner.

For fine steering control, one of the levers 46 will be moved so that the corresponding roller 74 will engage portion 68 of the corresponding cam edge 60. This will permit the drive wheel corresponding to the other lever 46 to move at a greater speed than the drive wheel corresponding to the first mentioned lever since there will be slippage of the belt 42 on the corresponding pulley 24 for the first-mentioned transmission 10. By selective swinging movements of both levers 46 in this manner, extremely fine steering control of the vehicle may be attained without completely causing either of the drive wheels of the vehicle to cease rotating. It is, of course, appreciated that the direction of the vehicle may be immediately reversed by moving one of the levers 46 into its reverse position illustrated in FIG. 5, while the other lever 46 is retained in its forward operating position. This will, of course, cause the vehicle to rotate about an axis midway between the drive wheels.

When it is desired to move the vehicle in reverse, both levers 46 will be swung in a clockwise sense when viewing FIG. 1 to their reverse positions illustrated in FIG. 5.

Since the vehicle is operated in reverse only a small fraction of the time during which the vehicle is in motion, levers 46 are not interlocked in place in their reverse positions of FIG. 5. Release of levers 46 by the operator will cause the levers 46 to move to a neutral position under the bias forces of spring 78.

Since levers 46 are normally operated in their forward directions, plates 56 are configured in the manner described so that portions 64 of edges 60 will cooperate with latch bars 70 to releasably maintain plates 56 in their forward operating positions illustrated in FIG. 4. The operator need only swing one or the other of levers 46 in a clockwise sense momentarily in order to obtain fine steering control of the vehicle or until the corresponding roller 74 engages the portion 68 of edge 60.

The present invention thus provides a relatively simple, economical transmission which may be applied to a number of different types of vehicles for driving the ground-engaging wheels therefor in forward and reverse directions while at the same time permitting fine steering control of the vehicle itself through the selective de-actuation of the transmission units coupled to the respective drive wheels of the vehicle.

Having thus described the invention, what is claimed as new and desired to be secured by Letters Patent is:

1. A power transmission comprising:
    a pair of spaced drive members rotatable in opposite directions;
    a pair of spaced-apart, rotatable driven elements;
    a continuous, flexible device trained around said elements and normally disposed in a first neutral position between said members;
    apparatus supporting one of said elements for movement of the latter and shifting of the device to a second position against one of said members for rotating the other of said elements in one direction, and alternately shifting the device to a third position against the other of said members for rotating said other element in the opposite direction; and
    mechanism coupled with said apparatus for releasably holding said device in either said first or said second position.

2. The invention of claim 1, said mechanism including a latch having parts movable relatively when said device is in said third position, and interlocked when the device is in said first and said second position.

3. The invention of claim 2, one of said parts having structure for camming the other of said parts out of interlocking relationship therewith during shifting of said device.

4. The invention of claim 3, said other part having means yieldably holding the same in engagement with said structure.

5. The invention of claim 2, one of said parts being secured to said apparatus for shifting the latter as said one part is moved, the other of said parts being mounted for movement into and out of interlocking relationship to said one part.

6. The invention of claim 5, said one part having structure for camming said other part out of interlocking relationship therewith during movement of said one part.

7. The invention of claim 5, and manually manipulatable assembly coupled with said one part for moving the latter.

8. A power transmission comprising:
    a plurality of spaced pulleys mounted for rotation within substantially the same common plane, including a first drive pulley adapted to be rotated in one direction, a second drive pulley adapted to be rotated in the opposite direction, a driven pulley, and an idler pulley;
    a belt trained around the driven pulley and the idler pulley and normally locked in a first neutral position between the drive pulleys;
    apparatus swingably supporting the idler pulley for movement of the latter to shift the belt alternately to a second position locked against the second drive pulley for rotating the driven pulley in said one direction, to a third unlocked position against the first drive pulley for rotating the driven pulley in said opposite direction, and to a fourth unlocked position against the second drive pulley for rotating the driven pulley in said one direction; and
    mechanism coupled with said apparatus for releasably locking the belt in either said first or said second position.

9. The invention of claim 8, said mechanism including a plate swingable with said apparatus and having a cam edge, and a spring-loaded latch engaging said edge, there being a pair of spaced, latch-receiving portions on said edge for releasably locking the belt in either said first or said second position.

References Cited by the Examiner
UNITED STATES PATENTS

| | | | |
|---|---|---|---|
| 2,336,135 | 12/1943 | Tangerman | 74—221 |
| 2,437,850 | 3/1948 | Dennis | 74—221 X |
| 2,578,675 | 12/1951 | Daniels | 74—221 |

DAVID J. WILLIAMOWSKY, *Primary Examiner.*

J. A. WONG, *Assistant Examiner.*